April 14, 1970
W. R. WEAVER
3,506,329
TELESCOPIC SIGHT WITH ADJUSTABLE
NEGATIVE AND ERECTOR LENSES
Filed Feb. 23, 1967
2 Sheets-Sheet 2
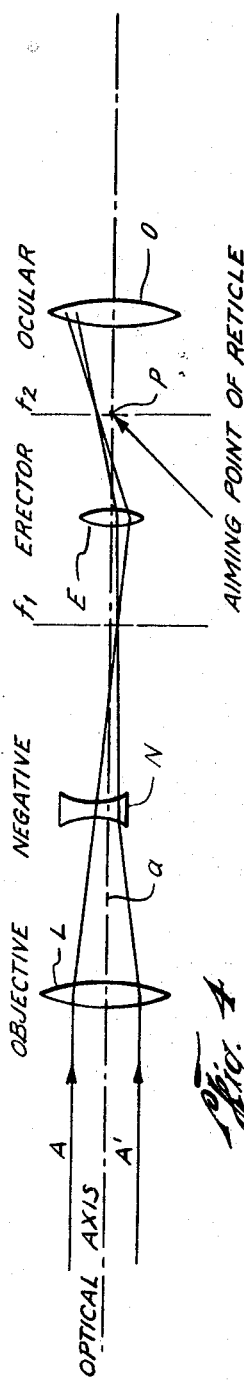
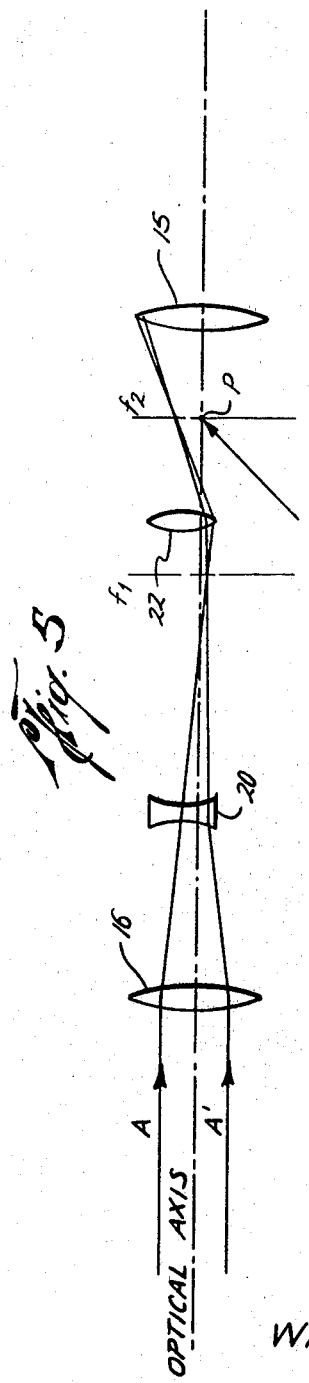
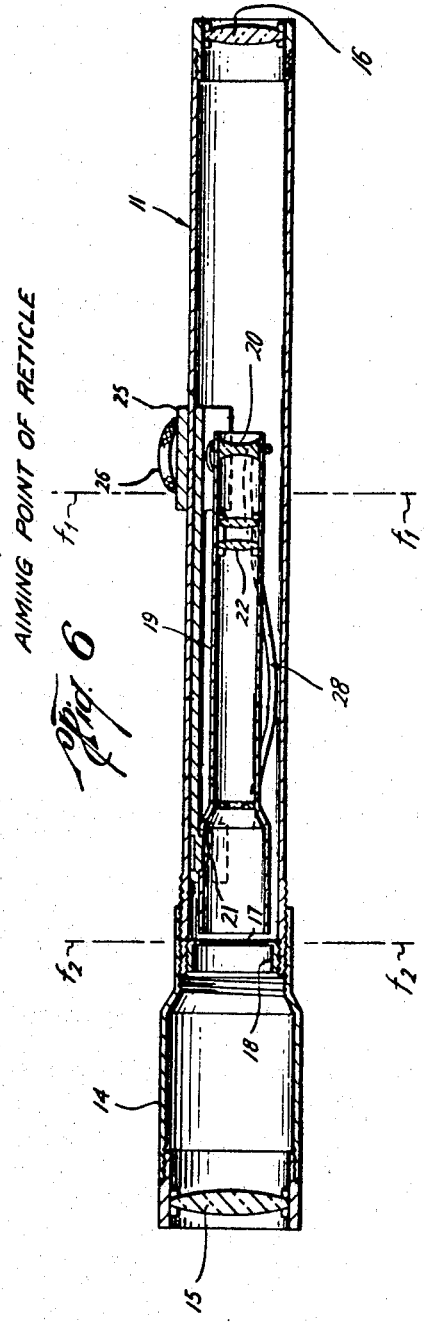
William R. Weaver
INVENTOR.
BY
ATTORNEY United States Patent Office 3,506,329
Patented Apr. 14, 1970

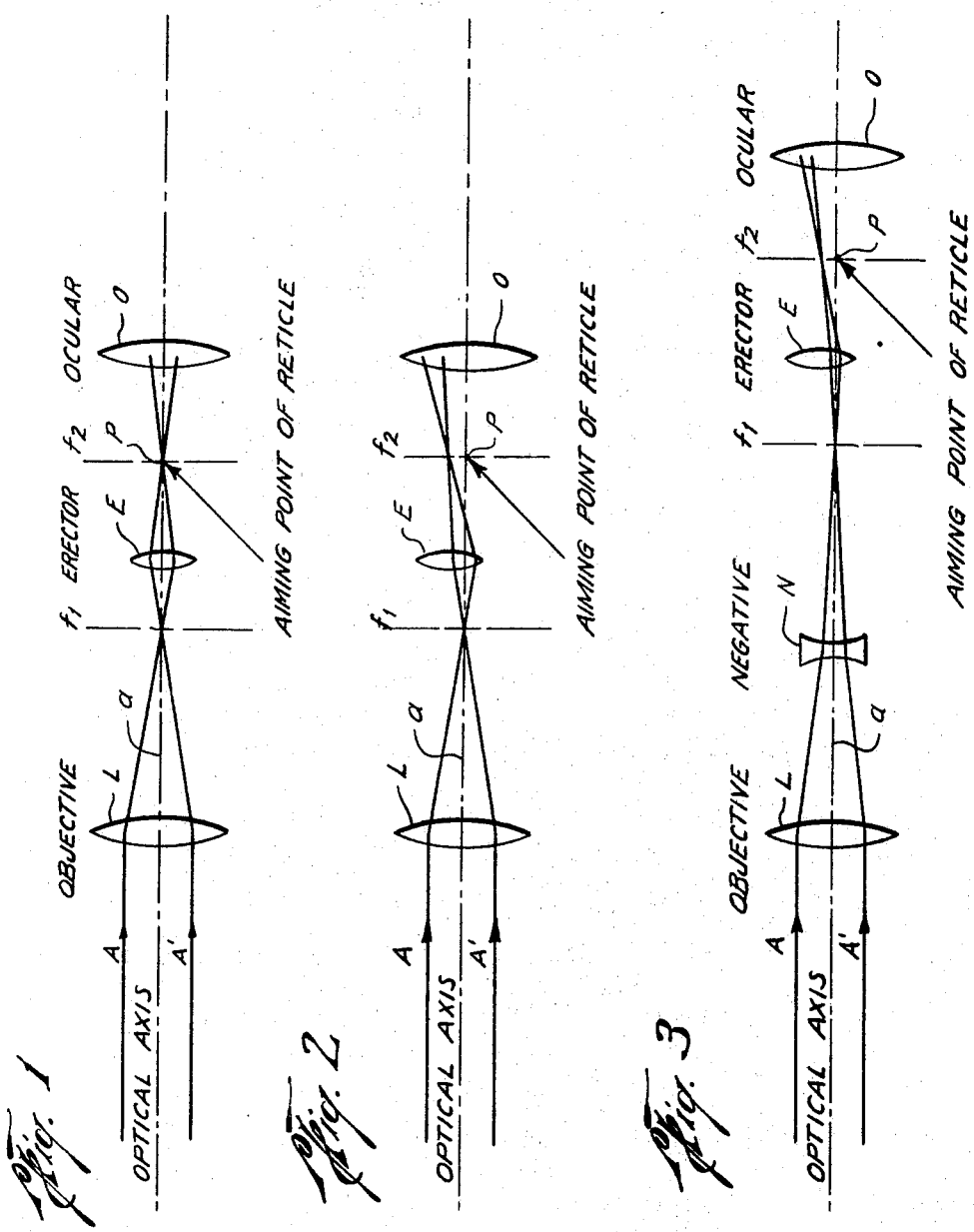

3,506,329
TELESCOPIC SIGHT WITH ADJUSTABLE NEGATIVE AND ERECTOR LENSES
William R. Weaver, El Paso, Tex., assignor to W. R. Weaver Company, El Paso, Tex., a corporation of Texas
Filed Feb. 23, 1967, Ser. No. 618,122
Int. Cl. G02b 27/32
U.S. Cl. 350—10          4 Claims

ABSTRACT OF THE DISCLOSURE

An optical instrument, particularly a telescope sight for firearms, employing a negative lens system arranged between the objective and the first image plane and coupled to the erector lens system in a manner to increase the range of image movement in the second image plane in response to movement of the erector lens system transversely of the optical axis of the instrument.

BACKGROUND OF THE INVENTION

In the use of telescopic sights (scopes) on firearms, various means of adjusting the sighting mark (reticle) relatively to the bullet's point of impact on the sighted object have been devised. The purposes of the adjustments are to correct for alignment errors in mounting the scope on the firearm, to correct for variations in the design and performance of various firearms and ammunitions, to correct for bullet drop and to adjust for range and windage conditions. These corrections are referred to as lateral and vertical adjustments or as windage and elevation adjustments.

Windage and elevation adjustment in conventional scopes in provided by angularly moving the entire body of the scope or by displacing lenses off of the optical axis within the body of the scope to thereby shift the sighted image across the reticle so that the aiming point of the reticle appears to be superimposed upon the point on the sighted object where bullet impact will occur. A similar result is accomplished by transversely shifting the reticle, but this method causes the reticle to appear off-center in the field of view.

In that the outside diameter of the conventional scope tube is an inch or less, the inside diameter does not provide a great deal of space within which to move lenses or prisms off of the scope's optical axis to effect the desired adjustment. In the more sturdily constructed scopes the space available for movement of lenses or prisms is further reduced by the scope's internal mechanisms which secure the lenses and which provide the means by which the lenses are moved. In order to withstand the recoil of firearms, those mechanisms must be constructed of materials suited to the purpose and they constitute great bulk when compared to the limited space within which they must be moved. Also, the lenses that are generally moved must be of sufficient diameter so as not to affect adversely the optical qualities of the scope, such as vignetting that occurs when erector (inverter) lenses of insufficient diameter are used. These factors limit the amount of windage and elevation adjustment that can be provided within the scope tube.

The design of the lens system, the number of lens elements to be moved off axis, the position of the movable lenses relatively to the immovable lenses, the design of the mechanisms by which movement is to be accomplished, and the materials and manufacturing processes used in constructing and assembling the various parts of the scope all affect the amount of movement that can be obtained.

In more conventional design of scope, windage and elevation adjustment is effected by universal movement of one end of the support or tube in which the erector system is mounted. Generally one end of the erector support is pivotally secured to the inner wall of the scope tube and the other end is free for universal movement. The free end of the erector support can be moved in any direction transversely of the scope's optical axis usually by means of screws extending through the scope tube and a spring or other biasing mechanism urging the erector support against the screws from generally an opposing direction. Movement of the screws causes corresponding movement of the erector support in the same direction as the movement of the screws.

When the erector lenses have been moved off of the optical axis by such means, light traveling through the scope tube from the objective lens is caused to strike the erector lenses at different angles of incidence than those when the erector lenses are on axis. The greater or lesser angle of incidence of the light causes the light to be refracted to a greater or lesser degree which causes the sighted image within the scope tube to shift relatively to the reticle.

Similarly, movement can be obtained by tilting prisms or moving any other lenses in the lens system when the angles of incidence, refraction or reflectance of light coming from the objective lens system are changed thereby.

SUMMARY OF THE INVENTION

This invention relates to a system for obtaining increased image displacement in optical instruments and, more particularly, to an improved telescopic sight for use on firearms.

The primary object of this invention is to provide a scope in which the magnitude of the image movements effected by windage and elevation adjustment can be greatly increased. This is done by introducing an additional lens or lens system forward of the erector system. This additional lens or lens system actually becomes a part of the objective system and is of negative focal length. This negative lens or system, when moved in the same transverse direction as the erector lenses, causes an additional image displacement in the same direction as the image displacement caused by the shift of the erector lens system. Since the negative lens system becomes an actual part of the objective system and since it is forward of the first image and is of minus focus, the image displacement it produces is in a direction opposite of that which would be produced by movement of a plus or positive lens system. Thus, the addition to the objective system must be of minus focus (negative) to produce the additional image movement desired.

Advantages can be realized in that it is possible to convert a ten power instrument to one of fourteen power merely by inserting a relatively weak negative lens behind the objective lens and obtaining adjustments by moving this negative lens transversely in conjunction with a similar movement of the erector lens. This results in an image movement at the rear image plane, where the reticle is situated, approximately equal in target dimensions in both the 10× and the 14×, with the same lateral movement of the erector lenses.

Other objects and advantages of this invention will become more readily apparent from the following detailed description when read in conjunction with the accompanying drawings which illustrates a useful embodiment in accordance with this invention.

In the drawing:
FIGS. 1 to 4, inclusive, are diagrammatic illustrations of several optical systems illustrating in each case the shifting position of the image at the second image plane produced by shift of the respective erector lens system, and presented for purposes of comparison with the system of the present invention;

FIG. 5 is a diagrammatic illustration of the optical system of the present invention; and FIG. 6 is a longitudinal, sectional view of a telescope sight for firearms employing the optical system of the present invention.

Referring to the drawings and initially to FIG. 6, there is illustrated a telescope sight (scope) in accordance with this invention which may be mounted on a firearm in any suitable manner whereby the sight barrel, designated generally by the numeral 11, will be held in substantially parallel relation to the barrel of the firearm by means of any suitable and known mounting arrangement (not shown).

Sight barrel 11 is provided at its left-hand end with an eye piece 14 in which is mounted the ocular lens 15. Eye piece 14 is threadedly secured to barrel 11 for longitudinal adjustment of the eye piece for purposes of focusing ocular lens 15 in the usual manner. An objective lens 16 is mounted in the right-hand end of barrel 11 in the usual manner. It will be understood that the ocular and objective lenses may be of any conventional simple or compound form and construction generally used in telescopic firearm sights. For the purposes of this description, the right-hand end of barrel 11 will be referred to as the foward end, and the left-hand end as the rearward end of the sight.

Mounted in the rearward end of sight barrel 11, adjacent the point of connection of eye piece 14, is a reticle 17, of any conventional or well-known form such as crosshair, post, or dot. Reticle 17 may be mounted in any suitable support member, such as the sleeve 18, which is externally threaded to be screwed into the rearward end of barrel 11 which is internally threaded to receive sleeve 18, as shown. It will be understood that reticle 17 will be positioned at the second image plane of the scope, indicated by the line $f_2$.

Mounted inside sight barrel 11, substantially coaxial therewith and forwardly of reticle 17, is an inverter (erector) lens support tube 19. An erector or image inverting lens system 22 is mounted in the bore of the support tube near its forward end. Lens system 22 may be of any suitable and generally convention simple or compound optical form and construction adapted to reinvert object images directed into the sight barrel from the objective lens and focused at the first image plane, indicated by the line $f_1$, forwardly of the erector lens system, in order that the image will appear in the normal upright position to the eye of the observer and relative to the reticle.

A negative lens 20 is mounted in support tube 19 forwardly of erector lens system 22 between the first image plane $f_1$ and objective lens 16. The negative lens may comprise a simple or compound lens construction adapted to provide the negative focal length in the system. The addition of this negative lens to the optical system of the scope makes it a part of the objective lens system of the scope and functions to increase the focal length of the objective lens system, and thus increase the magnifying power of the scope.

Mounted on the exterior of barrel 11 opposite the forward end of support tube 19 is a turret member 25 through which are threaded conventional elevation and windage adjustment screws 26 (one shown), which are generally mounted to be normal to each other for shifting the forward end of the erector tube in accordance with the desired degree of windings and elevation adjustment. A thrust spring 28 is positioned between tube 19 and the inner wall of barrel 11 opposite turret member 25 to resiliently urge the support tube against the ends of the adjustment screws, so as to obviate any back-lash during adjustment of the erector system and to effect positive movement of the latter in response to movement of the adjusting screws. Support tube 19 is pivotally supported from the barrel 11 by a pivot means 21 at a point rearwardly of the adjustment screws, so as to accommodate the pivotal movement of the erector tube in response to the windage and elevation adjustments. Any suitable and generally conventional form such, for example, as disclosed in my U.S. Patent No. 2,949,816, and it will be recognized that the windage and elevation adjustment means will also be conventional and their details, therefore, do not form a part of the present invention. The pivot for the erector tube will preferably be located as near the second image plane as convenient, but may be located at any suitable point affording the usually desired maximum degree of angular movement of the erector support tube.

For purposes of comparison with the optical system of the present invention and its operation, reference may now be made to the disagrammatic illustrations.

FIG. 1 illustrates a conventional optical system in which all lenses are axially aligned, illustrating essentially parallel light rays A, A' traveling from a distant point, entering the objective lens L, and focusing on the optical axis $a$ of the system at the first image plane $f_1$, and being refracted by erector lens E to focus at the aiming point P of the reticle located on the optical axis in the second image plane $f_2$, where it is seen by the viewer through the ocular lens O in centered position with respect to the optical axis.

FIG. 2 is a view of the conventional lens system of FIG. 1 in which the erector lens E has been displaced from the optical axis to illustrate light rays A, A' traveling from a distant point, entering the objective lens, focusing on the optical axis of the first image plane $f_1$, and being refracted by the erector lens to focus at a point off of the optical axis above the aiming point of the reticle in the second image plane $f_2$, where it is seen by the viewer through the ocular lens in a displaced position with respect to the optical axis.

FIG. 3 is illustrative of a lens system similar to those illustrated in FIGS. 1 and 2, but in which a negative lens N has been added to increase the focal length of the objective system and thus increase the magnifying power of the instrument, and in which the erector lens is displaced from the optical axis. Light rays A, A' are illustrated as traveling from a distance point, entering the objective lens, focusing on the optical axis at the first image plant $f_1$, and being refracted by the erector lens to focus at a point displaced from the optical axis and above the aiming point of the reticle in the second image plane $f_2$, where it is seen by the viewer through the ocular lens.

FIG. 4 illustrates a lens system identical to that illustrated in FIG. 3, but in which the negative lens is displaced from the optical axis, while the erector lens is axially aligned and illustrating the transmission of light rays A, A' entering the objective lens, being refracted by the negative lens to focus below the optical axis in the first image plane $f_1$ and being refracted by the erector lens to focus at a point above the aiming point of the reticle in the second image plane $f_2$, where it is seen by the viewer through the ocular lens.

FIG. 5 is a view illustrative of the lens system in accordance with this invention. The system illustrates the arrangement in accordance with this invention, in which both the negative lens 20 and erector lens 22 are both displaced from the optical axis of the system in the same direction. In this illustration, light rays A, A' passing through the objective lens 16 are refracted by the negative lens 20 to focus at a point P below the optical axis in the first image plane $f_1$ and being refracted by the erector lens 22 to focus above the aiming point P of the reticle in the second image plane $f_2$, where it is seen by the viewer through the ocular lens 15.

Assuming that the construction of the scope and the design of the lens system is such that the image movement illustrated in FIGS. 3 and 4 is the maximum image movement that can be accomplished by movement of either the negative lens or the erector lens but that greater image movement is necessary or desirable, greater movement can be effected by movement of both the negative and erector lenses in the same direction. In other words, by mounting the negative lens in the support in which the erector lenses are mounted and by moving the negative lens in the same direction and in conjunction with the erector lens, greater image movement can be obtained, as illustrated in FIG. 5. Note that the light refraction effected by the negative lens illustrated in both FIGS. 4 and 5 is identical. However, the conjunctive movement of the erector lens illustrated in FIG. 5 significantly changes the angles of incidence of light entering the erector lens which introduces additional refraction of the light to focus the sighted image at a point higher on the reticle. Thus the aiming point of the reticle is superimposed upon a point lower on the sighted object than can be accomplished by any other method now known to the art.

FIGS. 2, 3 and 4 illustrate methods of windage and elevation adjustment common to the art, whereas FIG. 5 represents an advancement of the art in accordance with this invention. Movement of the negative lens (which is an element in the objective lens system) in conjunction with the erector lens system operates to compound the image movement of the negative lens and the erector lenses; thus, the conjunctive movement accomplishes far greater image movement in response to windage and elevation adjustment than is possible with more conventional optical systems.

In practical use, the addition of a negative lens in the objective system, while useful, is not especially advantageous in telescopes of low magnification (below 10 power). However, in telescopes of high magnification (above 10 power) it provides three distinct advantages: (1) it allows the use of a short focal length objective lens by increasing the effective focal length of the objective lens system, (2) by increasing the effective focal length of the objective lens system it enables one to construct a telescope of high magnification but of shorter length than a telescope of similar magnification in which a negative lens is not used, and (3) it provides means to effect greater effective windage and elevation adjustments as described herein.

While, as indicated, a preferred arrangement is to mount the negative lens element in the same support as the erector lens negative lens element in the same support as the erector lens element, since this provides for simultaneous and conjunctive movement of both elements in the same direction in response to windage and elevation adjustment, other arrangement for obtaining the desired results may be used. The negative lens element may be mounted so as to permit it to be moved independently of the erector lens element. In such case, one element may be moved first and the other subsequently, but always in the same direction transversely of the optical axis until the desired total adjustment is attained.

In another modification the reticle, instead of being fixedly mounted in the scope barrel, as illustrated, may be mounted in the rearward end of the pivoted erector support but the second image plane.

What I claim and desire to secure by Letters Patent is:

1. A telescope sight for firearms comprising in combination with a sight barrel, an optical system including longitudinally spaced objective and ocular elements and an erector element disposed between said objective and ocular elements and defining therewith an optical axis, a first image plane between the objective element and the erector element, and a second image plane between the erector element and the ocular element, support means for said erector element, means pivotally mounting said support means to said barrel, a sighting reticle positioned at the second image plane, a negative lens element mounted on said support means at a point between the first image plane and the objective element, and adjustment means cooperating with said support means for shifting said erector element and said negative lens element conjointly transversely of said optical axis.

2. A telescope sight for firearms comprising:
   (a) a sight barrel;
   (b) objective lens means connected to said sight barrel;
   (c) ocular lens means connected to said sight barrel and spaced apart from said objective lens means and defining with the latter an optical axis within said sight barrel;
   (d) erector lens means interposed between said ocular lens means and said objective lens means, said erector lens means being movable transversely of said optical axis;
   (e) negative lens means interposed between said erector lens means and said objective lens means, said negative lens means being movable transversely of said optical axis, and said negative lens means being operative, when moved transversely in the same direction as said erector lens means, to increase the range of movement of a sighted image in a predetermined image plane disposed between said erector lens means and said ocular lens means; and
   (f) means on said sight operative to shift said negative lens means and said erector lens means in a coincidental direction transversely of said optical axis.
   (g) a sighting reticle mounted in said predetermined image plane.

3. The telescope sight of claim 2, further comprising support means pivotally mounted in said sight barrel, said erector lens means and said negative lens means being mounted in said support means whereby pivotal movement of said support means results in conjoint transverse movement of said erector lens means and said negative lens means.

4. A telescope sight for firearms comprising in combination with a sight barrel, an optical system including:
   (a) longitudinally spaced objective and ocular lens means defining an optical axis within said sight barrel;
   (b) erector lens means within said sight barrel and interposed between said objective and ocular lens means, said objective, ocular, and erector lens means defining a first image plane between the objective and erector lens means, and a second image plane between the erector and ocular lens means;
   (c) a sighting reticle positioned at said second image plane;
   (d) support means housing said erector lens means, said support means being pivotally mounted within said sight barrel;
   (e) negative lens means mounted on said support means at a point between said objective lens means and said erector lens means; and
   (f) adjustment means cooperating with said support means and operative to pivot the latter to conjointly shift said erector lens means and said negative lens means transversely of said optical axis.

References Cited

UNITED STATES PATENTS

| 2,489,578 | 11/1949 | Hillman | 350—10 |
| 2,784,641 | 3/1957 | Keuffel et al. | 350—10 X |
| 2,949,816 | 8/1960 | Weaver | 350—10 X |
| 3,161,716 | 12/1964 | Burris et al. | 350—10 X |

DAVID SCHONBERG, Primary Examiner

T. H. KUSMER, Assistant Examiner

U.S. Cl. X.R.

350—48, 54